United States Patent [19]

Sudoh

[11] Patent Number: 5,235,675
[45] Date of Patent: Aug. 10, 1993

[54] PRINTER CONTROL SYSTEM FOR CONTROLLING PRINTERS DIFFERING FROM EACH OTHER IN DOT DENSITY

[75] Inventor: Eisho Sudoh, Tokyo, Japan

[73] Assignee: Oki Electric Industry Co., Ltd., Tokyo, Japan

[21] Appl. No.: 826,655

[22] Filed: Jan. 22, 1992

Related U.S. Application Data

[63] Continuation of Ser. No. 380,596, Jun. 26, 1989, abandoned.

[51] Int. Cl.⁵ .......................................... G06K 15/00
[52] U.S. Cl. ............................. 395/109; 395/114; 395/115; 400/73; 400/83
[58] Field of Search ............... 340/750; 400/83, 63, 400/73, 76; 395/109, 114, 115

[56] References Cited

U.S. PATENT DOCUMENTS

| | | | |
|---|---|---|---|
| 4,639,741 | 1/1987 | Onoue | 346/76 PH |
| 4,644,477 | 2/1987 | Kojima | 364/523 |
| 4,849,908 | 7/1989 | Kurokawa et al. | 364/518 |
| 4,979,131 | 12/1990 | Suzuki | 364/519 |
| 4,980,841 | 12/1990 | Sugitami | 364/518 |
| 5,010,497 | 4/1991 | Shimada | 364/519 |

FOREIGN PATENT DOCUMENTS

2201273A  8/1988  United Kingdom .

OTHER PUBLICATIONS

"Print Control System"; Patent Abstract of Japan, vol. 7, No. 142 (P-205) [1287]. 22nd Jun. 1983; & JP-A-58 056 085 (Yasushi Ueda).

Primary Examiner—Phu K. Nguyen
Attorney, Agent, or Firm—Wenderoth, Lind & Ponack

[57] ABSTRACT

A printer control system receives ruled line data for the entire printing region with respect to the row direction included in ruled line print data, and image data included in image print data in a plurality of blocks from a host system, accumulates the blocks of the ruled line data and those of image data until all the ruled line data and all the image data are received, and then converts the print dot density of the accumulated ruled line data and image data into a print dot density matching an internal printer thereof. Therefore, the ruled line print data and the image print data are printed correctly without dislocation with respect of the row direction.

2 Claims, 9 Drawing Sheets

| Fig. 2A |
| Fig. 2B |

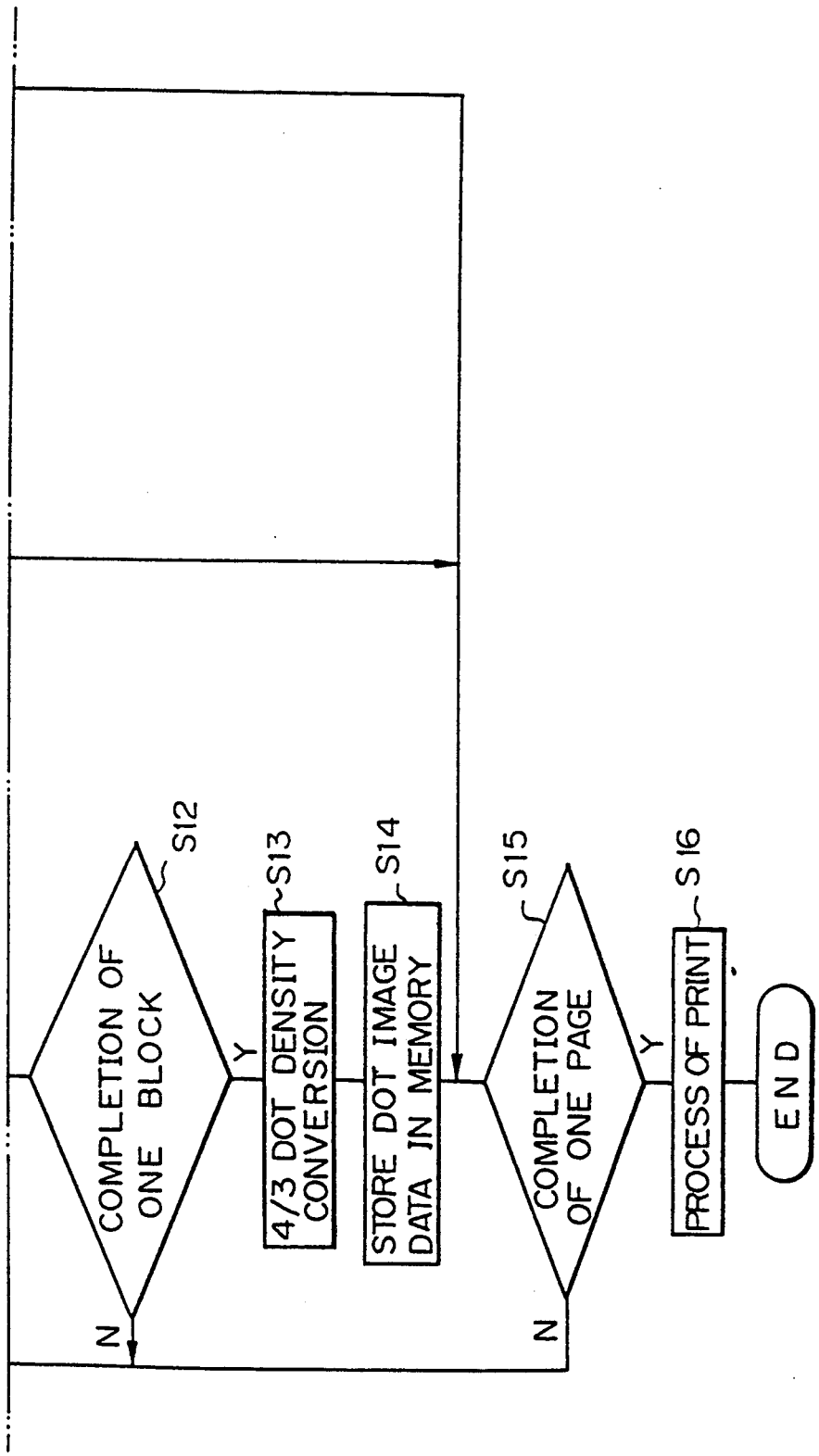

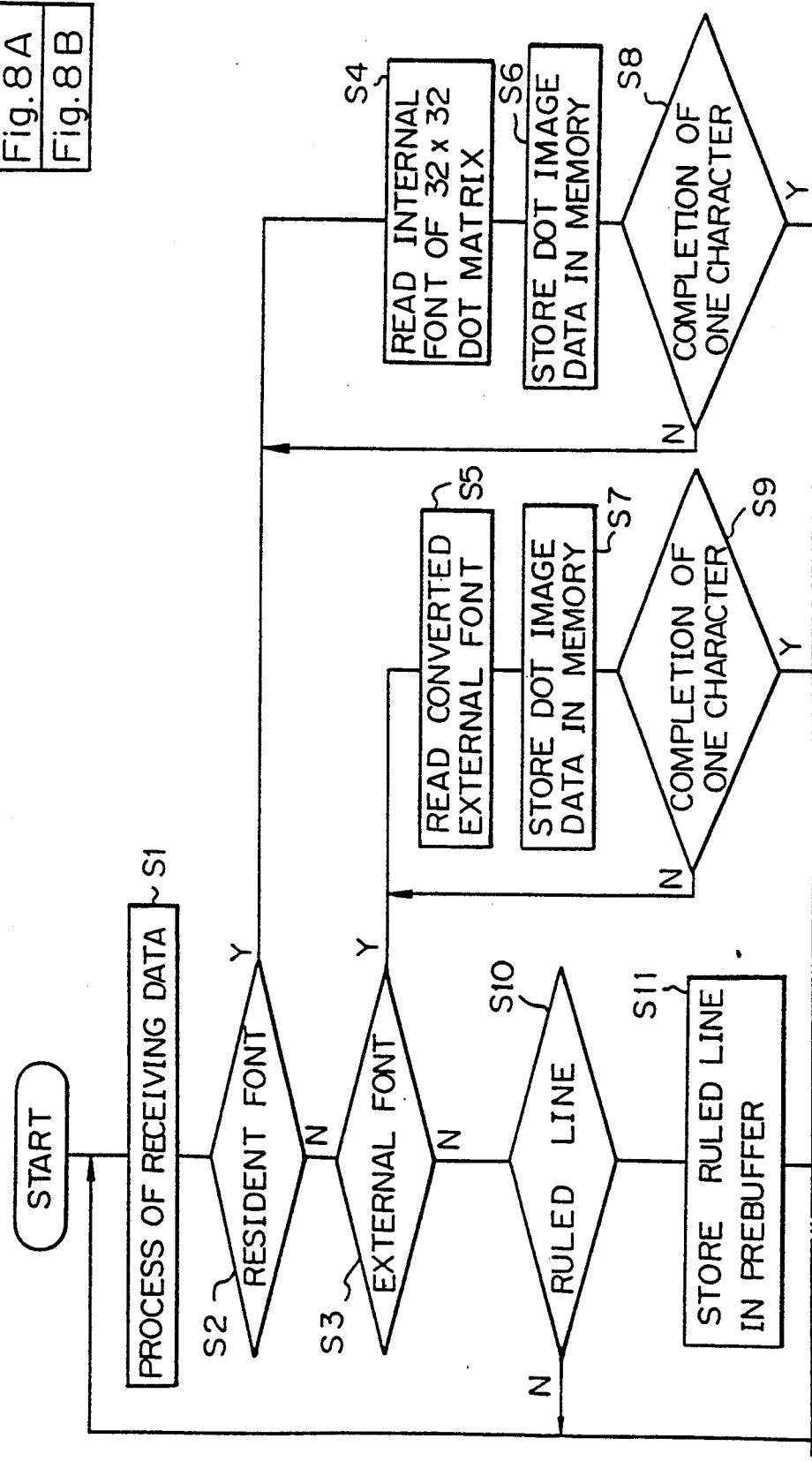

PRINTER CONTROL SYSTEM FOR CONTROLLING PRINTERS DIFFERING FROM EACH OTHER IN DOT DENSITY

This application is a continuation of now abandoned application, Ser. No. 07/380,596 filed on Jun. 26, 1989 now abandoned.

BACKGROUND OF THE INVENTION

The present invention relates to a control system for controlling a plurality of printers, differing from each other in dot density, included in a printing system.

In most cases, a printing system including a plurality of printers differing from each other in dot density and capable of simultaneously operating one or more of the plurality of printers includes an impact wire dot serial printer and a nonimpact page printer.

Generally, the highest dot density of the serial printer is 180 dots per inch and the serial printer generates characters by a dot matrix of 24×24, while the highest dot density of the page printer is 240 dots per inch and the page printer generates characters by a dot matrix of 32×32. The dot density of either the serial printer or the page printer must be converted to print characters in a format specified by a host system connected to the printing system, namely, in a character size substantially the same as that specified by the host system. Ordinarily, the dot density of the page printer, which, in most cases, is connected additionally to the printing system, is converted. In this case, characters are expressed by dot images formed by a dot matrix, namely, a font pattern.

FIG. 1 is a block diagram of a page printer controlled by a conventional printer control system. In FIG. 1, there are shown a microprocessor 1, a program memory 2, an interface 3 which communicates with a host system, not shown, for exchanging data, a receiving buffer 4 for temporarily storing received data including print data, a prebuffer 5 for storing dot image data included in blocks of print data for printing ruled lines and images, a print control unit 6 for editing the received print data in dot image data according to a printing format, a dot image data memory 7 for storing the dot image data edited by the print control unit 6, a printer interface 8 which controls operation; for reading the dot image data from the dot image memory 7 and transferring the dot image data read from the dot image memory 7, a dot density converting unit 9 for magnifying or reducing a font pattern down-loaded from the host system through the interface 3 and the receiving buffer 4, namely, an external font pattern, and a block of dot image data stored in the prebuffer 5 in conformity with the dot density of the page printer, a resident font memory 10 for storing font patterns which are used frequently as resident fonts, an external font memory 11 for storing an external font pattern magnified or reduced by the dot density converting unit 9, a font memory control unit 12 for address control to assign the external font pattern magnified or reduced by the dot density converting unit 9 to a specified address and for address control to read a specified font pattern from the resident font memory 10 or the external font memory 11 on the basis of a resident font specifying code or an external font specifying code included in the received print data, and a printing unit 13 for printing characters and ruled lines on a sheet on the basis of the dot image data given thereto from the printer interface 8.

In some cases, a system comprising the components 1 to 13 shown in FIG. 1 is regarded as a page printer, while in other cases, only the printing unit 13 is regarded as a page printer and a system comprising the rest of the components 1 to 12 is regarded as an additional controller. In this case, it is assumed that the resident font pattern is formed of a dot matrix of 32×32 and the external font pattern is formed of a dot matrix of 24×24.

The operation of the page printer shown in FIG. 1 will be described hereinafter with reference to FIG. 2 showing a control program for controlling the page printer. Prior to starting print data reception, the page printer is down-loaded through the interface 3 and the receiving buffer 4 with an external font pattern by the host system, and the external font pattern is stored in the external font memory 11 after being converted into a font pattern of a dot matrix of 32×32 matching the print dot density of the printing unit 13 by the dot density converting unit 9.

Print data to be printed out by the page printer is transferred from the host system through the interface 3 to the receiving buffer 4 in step s1. Then, the microprocessor 1 executes the following control program.

A query is made in step s2 to see if a font code included in the print data stored in the receiving buffer 4 is a font code specifying the resident font pattern and, when the response in step s2 is negative, a query is made in step s3 to see if the font code is a font code specifying the external font pattern stored in the external font memory 11. The identification of the font code is made with reference to the first byte of a character code of known binary byte code system.

When the response in step s2 is affirmative, the address of a resident font pattern corresponding to the font code is given to the font memory control unit 12 in step s4. When the response in step s3 is affirmative, the address of the external font pattern corresponding to the font code is given to the font memory control unit 12 in step s5.

At the same time, the microprocessor 1 gives an instruction to the print control unit 6 to edit the font pattern read from the resident font memory 10 or the font pattern read from the external font memory 11 according to codes specifying the character pitch and the line pitch included in the print data. In case the character pitch and the line pitch are expressed in a unit of a dot, the instruction is expressed in a unit of a dot matching the print dot density of the printing unit 13.

The print control unit 6 edits the resident font pattern or the external font pattern in dot image data according to the instruction given thereto from the microprocessor 1, and then stores the dot image data in the dot image memory 7 (steps s6, s7, s8 and s9).

A process for printing a ruled line will be described hereinafter.

FIG. 3 shows ruled line print data 14 for printing a ruled line. The ruled line print data 14 is data of a printing format for one block matching the dot matrix of 24×24. The ruled line print data 14 consists of a code ESC, a code J and data n1, n2, n3, n4, d1, d2, d3, ... The code J indicates that the following ruled line data d1, d2, d3, ... are dot image data of twenty-four bits along the row direction. The data n1, n2, n3 and n4 represent the length (the number of bits) of the ruled line data d1, d2, d3, ... along the row direction. The number of bits along the row direction is an optional value not greater than a value indicating the length of the printing range in the direction of the recording sheet. The data d1, d2, d3, ... are ruled line data (dot image data) 15 of twenty-four dots in the line direction and dots in the row direction. For example, the data d1, d2 and d3 among the ruled line data 15 indicate the contents of three bytes (twenty-four bits) of the dot image data of the first row.

The ruled line print data 14 for one block is transferred from the host system through the interface 3 to the receiving buffer 4.

When the print data stored in the receiving buffer 4 is the ruled line print data 14 (step s10), the microprocessor 1 stores the ruled line data 15 of twenty-four bits in the line direction and bits in the row direction in the prebuffer 5 (step s11). The ruled line data 14 is identified by the codes ESC and J.

When the ruled line data 15 for one block is stored in the prebuffer 5, namely, when the response in step s12 is affirmative, the dot density converting unit 9 converts the ruled line data 15 into dot image data matching the print dot density of the printing unit 13 (step s13), and then the microprocessor 1 gives an instruction to the print control unit 6 to store the converted dot image data in the dot image memory 7 (step s14).

FIG. 4 shows the details of the ruled line data 15 for one block for the serial printer of a 24×24 dot matrix, and ruled line data 16 for one block for the page printer of a 32×32 dot matrix produced by converting the ruled line data 15. The dot image data of twenty-four dots of a dot pitch of 1/180 in. in the line direction is converted into the dot image data of thirty-two dots of a dot pitch of 1/240 in. in the line direction, and the dot image data of dots of a dot pitch of 1/180 in. in the row direction is converted into the dot image data of 4/3 dots of a dot pitch of 1/240 in. in the row direction.

Thus, the ruled line data is subjected to dot density conversion in blocks and the converted dot image data is written in the dot image memory 7. This procedure is repeated until all the ruled line data for one page is stored in the dot image memory 7 (step s15). Naturally, the print control unit 6 superposes the previously stored character data and the ruled line data in storing data.

After all the ruled line data for one page has been thus stored, the printer interface 8 reads the dot image data from the dot image memory 7 upon the reception of an instruction from the microprocessor 1 and transmits the dot image data to the printing unit 13 to print the dot image data (step s16).

FIG. 5 shows an example of printed ruled lines. In FIG. 5, indicated at 17 is a recording sheet, at 18 is the origin of the recording sheet 17, at 19 are ruled lines, at A is the distance from the origin 18 to the first ruled line in the row direction, at B are intervals between the ruled lines in the row direction, and at C are intervals between the ruled lines in the line direction.

Suppose that A=31 dots (31/180 in.), B=180 dots (180/180 in.=1 in.) and C=60 dots (60/180 in.=⅓ in.) in the ruled line data for the serial printer of a 1/180 in. dot pitch transmitted from the host system. Then, the converted ruled line data for the page printer of a 1/240 in. dot pitch must be 41 dots (31×4/3=41.333) in A, 240 dots (180×4/3=240) in B, and 80 dots (60×4/3=80) in C.

However, in some cases, the position of the ruled lines with respect to the row direction deviates from a correct position depending on the number of dots in the row direction of the ruled line data included in the ruled line print data for one block, because the conversion ratio: (1/180 in.)/(1/240 in.)=4/3 (1.333 ... ) is not an integer.

Suppose that the host system provided ruled line print data for two blocks, for example, ruled line print data for one block including ruled line data of twenty-nine dots in the row direction for the distance A and ruled line print data for another block including ruled line data of two dots in the row direction successive to the twenty-nine dots. The ruled line data of twenty-nine dots in the row direction is converted into ruled line data of thirty-nine dots (29×4/3=38.666 ... ) and the ruled line data of two dots in the row direction is converted into ruled line data of three dots (2×4/3=2.666 ... ). Thus, ruled line data of thirty-one dots (29+2) included in the ruled line print data for the two blocks provided by the host system is converted into ruled line data of forty-two dots in total.

FIG. 6 shows printed ruled lines, in which the ruled line data of the distance A for the first line was given in the ruled line print data for one block, and the ruled line data of the distance A for the second line was given in the ruled line print data for two blocks.

Thus, the conventional printer control system unavoidably causes the printing position of the ruled line to be dislocated from a correct position depending on the number of dots in the row direction of row of the ruled line data included in the ruled line print data provided by the host system.

SUMMARY OF THE INVENTION

It is an object of the present invention to provide a printer control system for controlling a plurality of printers differing from each other in print dot density, capable of converting the print dot density of print data provided by a host system so that the print data provided by the host system can be printed properly in the print dot density of a selected printer among those controlled by the printer control system to secure satisfactory print quality.

It is another object of the present invention to provide a printer control system for controlling a plurality of printers differing from each other in print dot density, capable of controlling the printers so that ruled lines and images (patterns) are printed properly without dislocation.

It is a further object of the present invention to provide a printer control system for controlling a plurality of printers differing from each other in print dot density, capable of providing superposed prints of characters, and ruled lines and images (patterns).

To achieve the foregoing object, the present invention provides a printer control system capable of converting the print dot density of print data for an external printer of a print dot density to print the print data by another printer of a print dot density differing from that of the external printer in substantially the same size as that printed by the external printer, comprising: a buffer memory capable of storing dot image data included in ruled line print data and image print data downloaded in blocks by a host system and consisting of dots in the line direction and dots of an optional number within the entire printing range with respect to the row direction for the external printer; and a device capable of making the buffer memory to store the dot image data included in the ruled line print data and image print data provided in blocks for the entire printing range with respect to the row direction and subjecting the dot image data stored in the buffer memory in batch to print dot density conversion.

The above and other objects, features and advantages of the present invention will become more apparent from the following description taken in conjunction with the accompanying drawings.

BRIEF DESCRIPTION OF THE DRAWINGS

FIG. 2 included FIGS. 2A and 2B is a flow chart of assistance in explaining a control program to be executed by the conventional printer control system for controlling the page printer of FIG. 1;

FIG. 8 included FIGS. 8A and 8B is a flow chart of assistance in explaining a control program to be executed by the printer control system of FIG. 6.

DESCRIPTION OF THE PREFERRED EMBODIMENT

Figure 1:
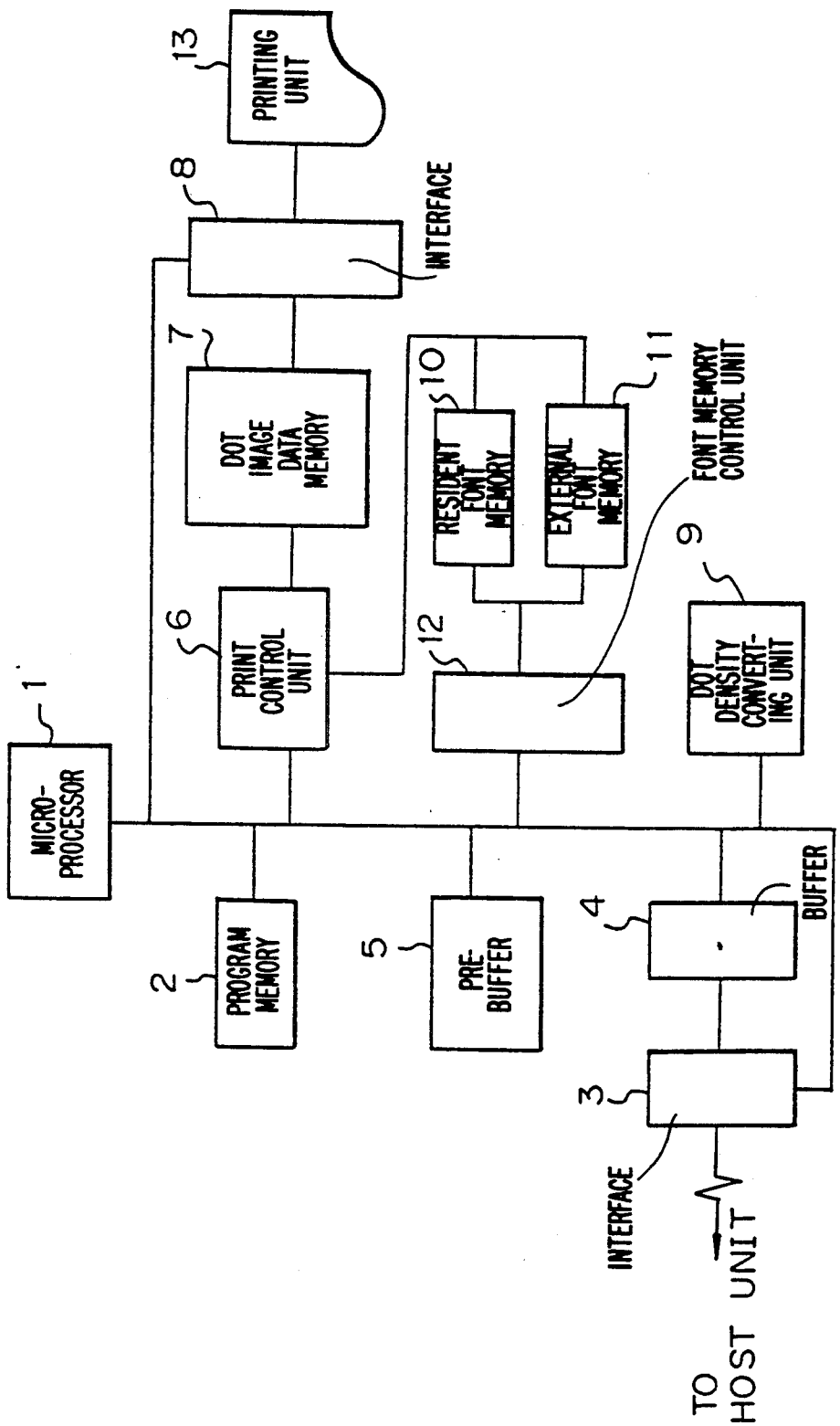
FIG. 1 is a block diagram of a conventional printer control system for controlling a page printer.
Figures 2, 2A:
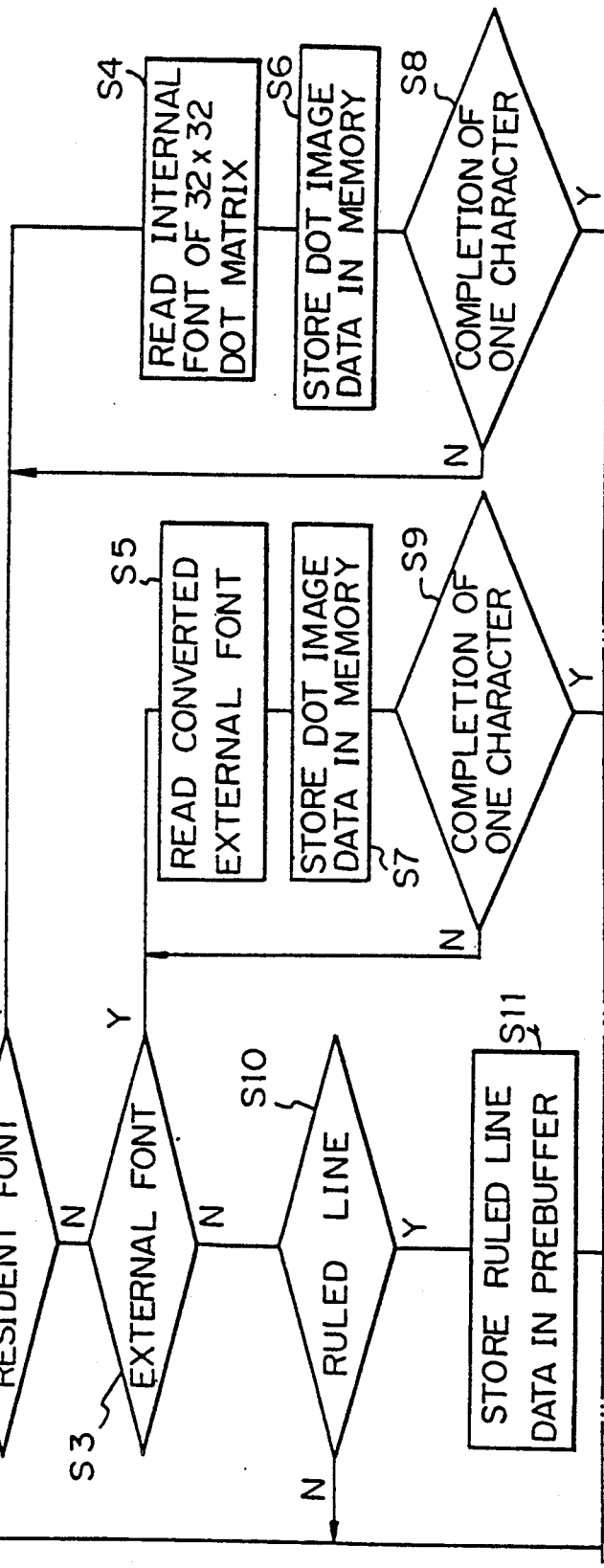
Figure 3:
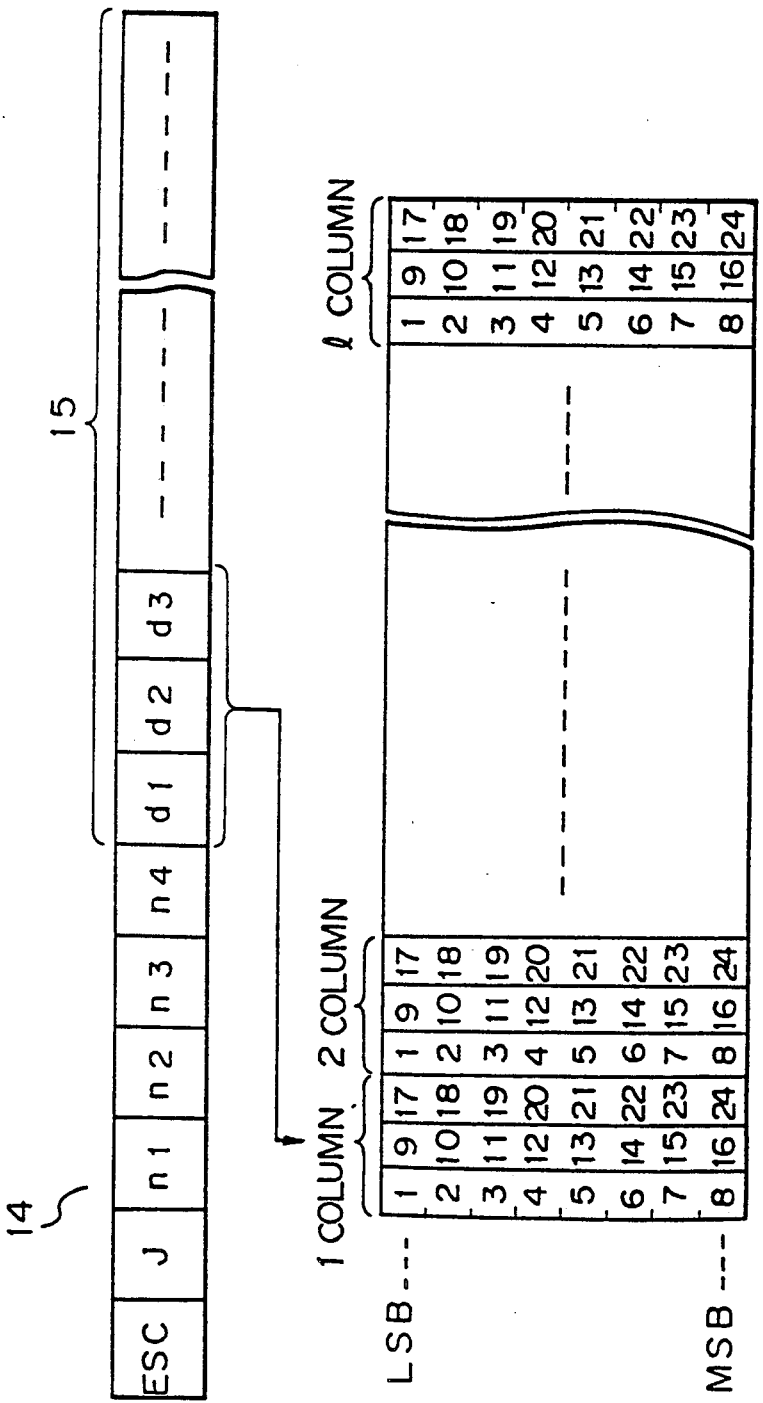
FIG. 3 is an illustration of assistance in explaining the constitution of a ruled line print data.
Figure 4:
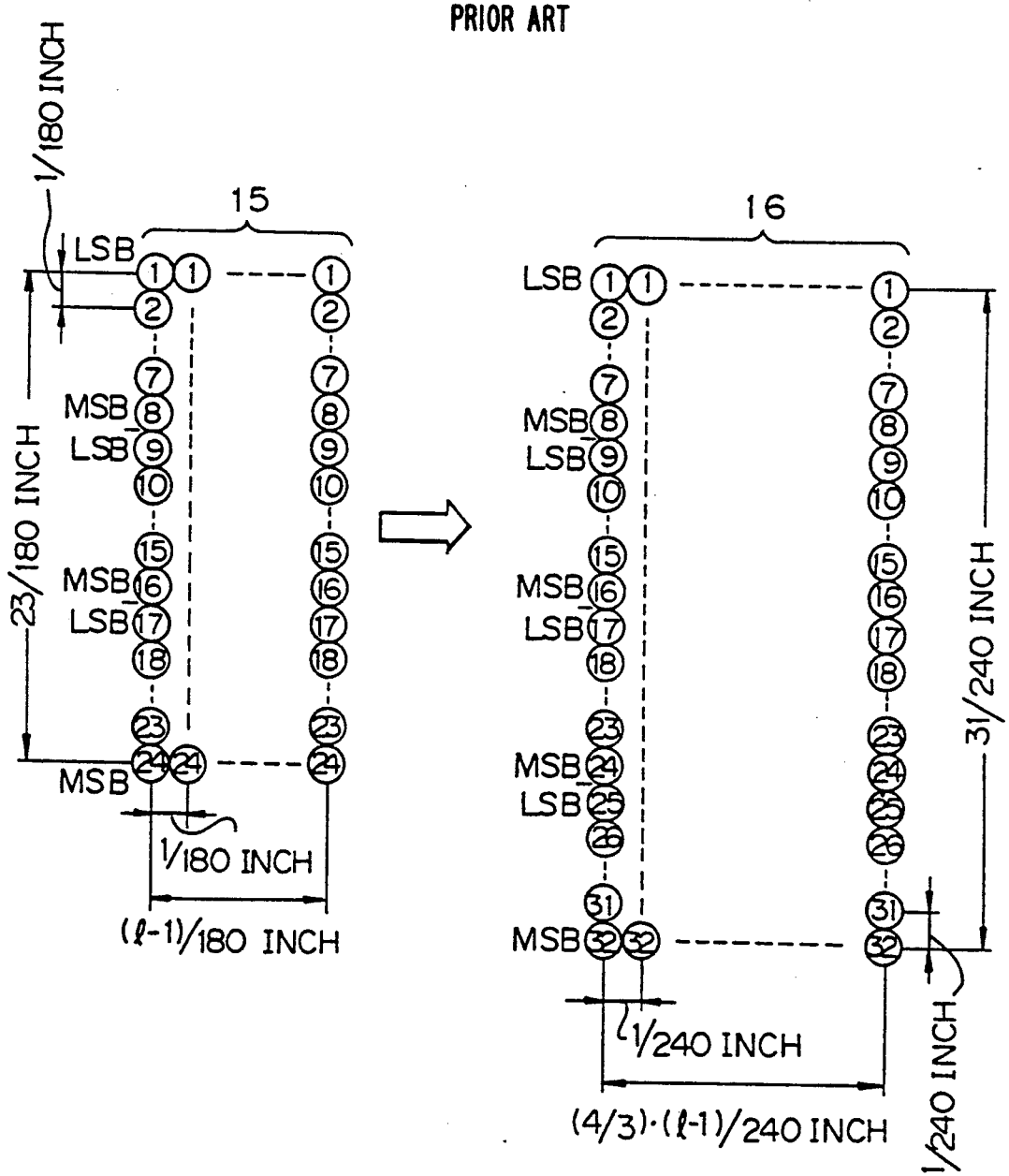
FIG. 4 is an illustration of assistance in explaining a manner of print density conversion for the ruled line data.
Figure 5:
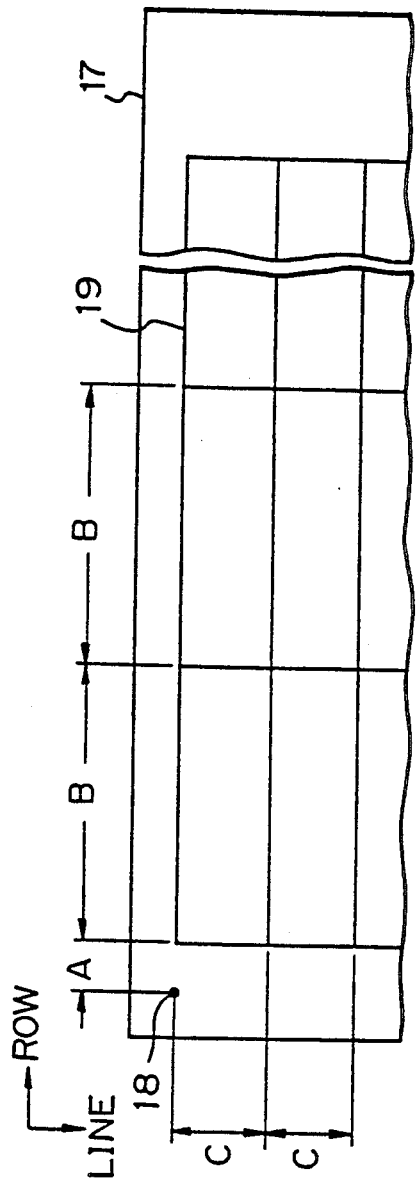
FIG. 5 is a diagram showing an example of printed ruled lines.
Figure 6:
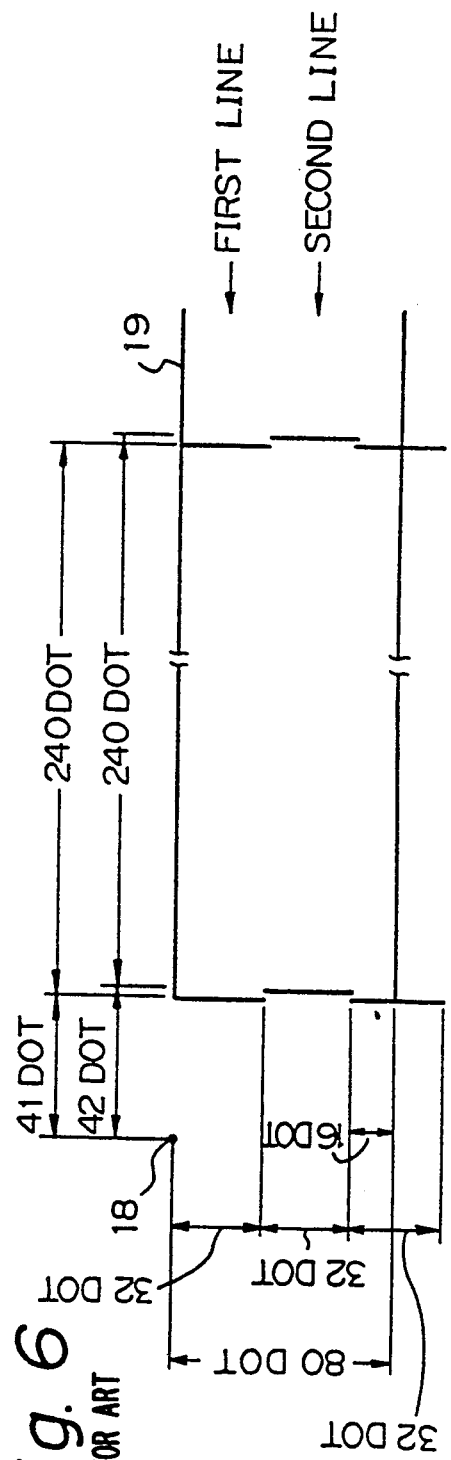
FIG. 6 is a diagram showing another example of printed ruled lines.

A printer control system embodying the present invention will be described with reference to FIG. 7, in which parts like or corresponding to those described with reference to FIG. 1 are denoted by the same reference characters.

Figure 7:
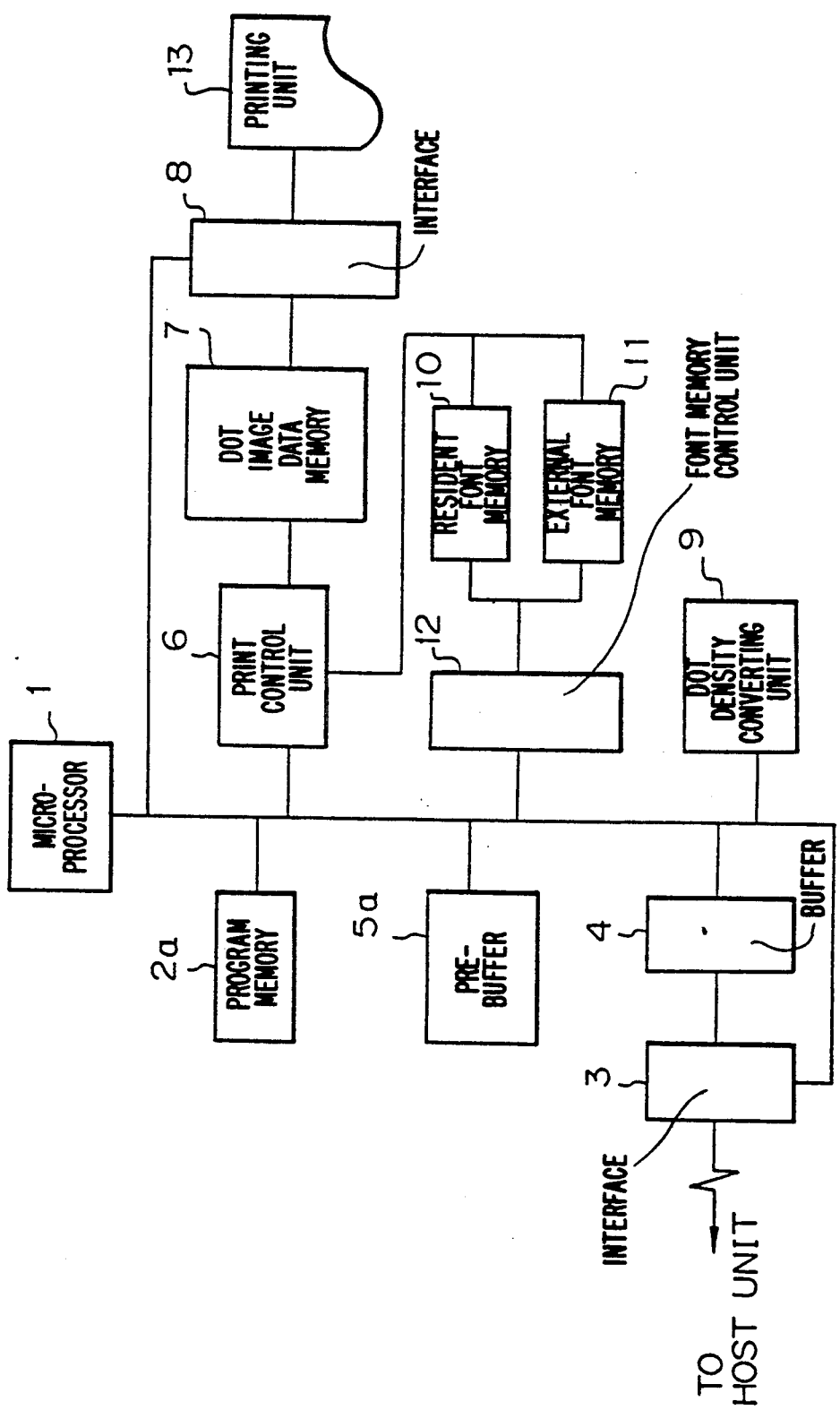
FIG. 7 is a block diagram of a printer control system embodying the present invention, for controlling a page printer.

Shown in FIG. 7 are a microprocessor 1, a program memory 2a, an interface 3, a receiving buffer 4, a prebuffer 5a, a print control unit 6, a dot image memory 7, a printer interface 8, a dot density converting unit 9, a resident font memory 10, an external font memory 11, a font memory control unit 12, and a printing unit 13. Actual devices employed as those components are as follows.

Microprocessor 1: 880186 (Intel), Program memory 2a: HN27512 (Hitachi), Interface 3: i8051 (Intel), Receiving buffer 4: HM50565 (Hitachi), Prebuffer 5a: HM50464 (Hitachi), Print controller 6: MSM76V-007 (OKI), Dot image memory 7: HM514258 (Hitachi), Printer interface 8: MSM79V001 (OKI), Dot density converting unit 9: MSM78H015 (OKI), Resident font memory 10: PD23C4000C (NEC), External font memory 11: HM50464 (Hitachi), Font memory control unit 12: MSM76V001 (OKI).

The prebuffer 5a is the same in function as the prebuffer 5 of the previously described conventional printer control system, except that the prebuffer 5a is capable of storing ruled line data and image data for the entire printing range with respect to the row direction, namely, those for one line, included in print data for printing ruled lines and images given thereto in blocks.

Figure 8B:
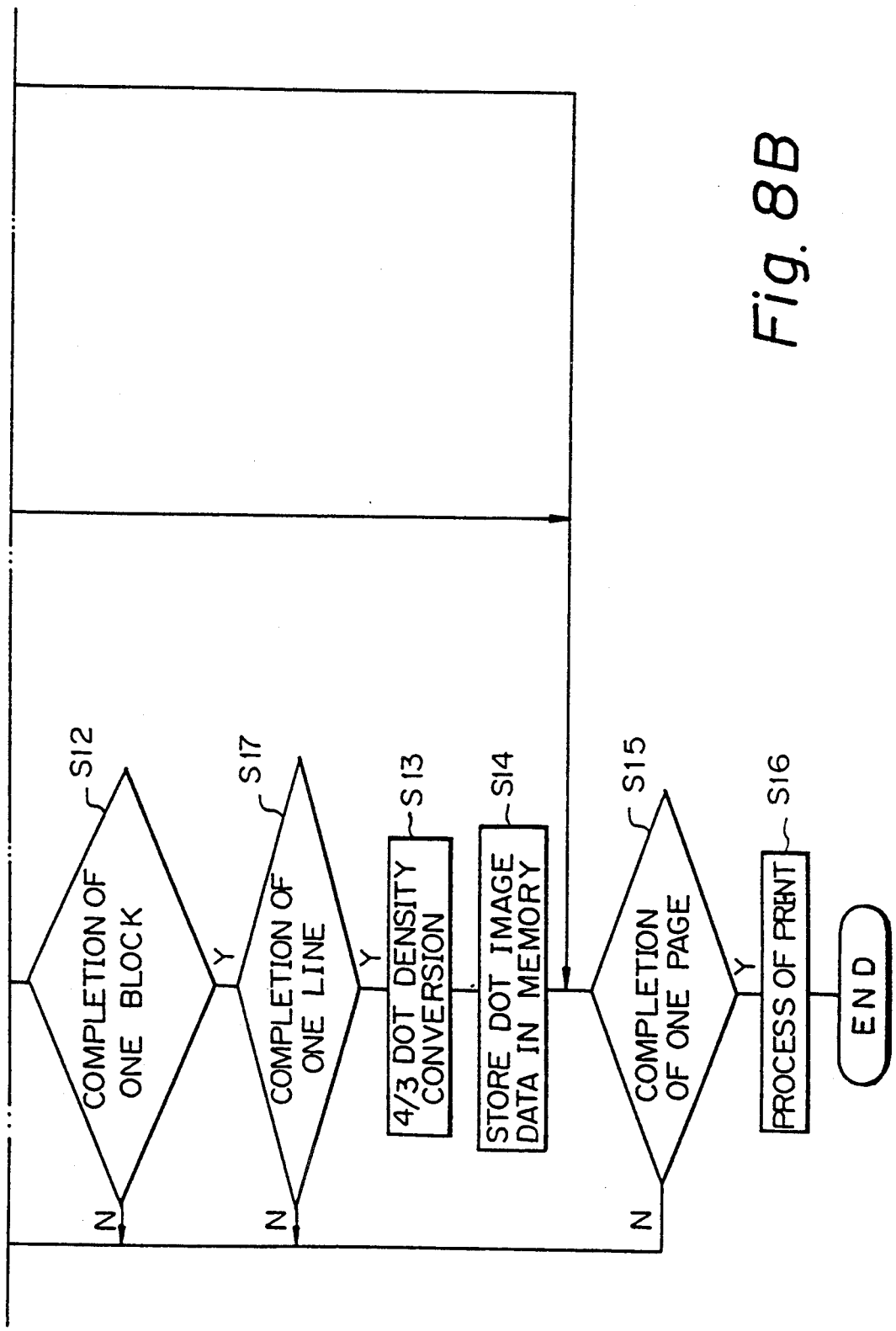

The program memory 2a stores a control program explained in FIG. 8 to be executed by the microprocessor 1 in carrying out printer control operation by the printer control system of the present invention.

Print data, the same as that previously described with reference to the conventional printer control system, is transmitted from a host system to the printer control system, and a dot density converting process for converting the dot density of an external font and a printing process for printing out characters of a resident font and an external font are the same as those (steps s1 through s9) executed by the conventional printer control system, and hence the description thereof will be omitted When ruled line print data is stored in the receiving buffer 4 (step s10), the microprocessor 1 stores dot image data for one block of twenty-four bits in the line direction and each number of bits specified by the data n1 to n4 in the row direction in the prebuffer 5a (steps s11 and s12).

Then, the microprocessor 1 decides whether or not the ruled line data for the entire printing range with respect to the row direction, namely, the ruled line data for one line, has been stored in the prebuffer 5a (step s17) The decision in step s17 is made on the basis of a response to a query to see if a return (line feed) code LF, a V-TAB code indicating a tab of vertical direction (a direction along line) of the like are included in the print data.

When the decision in step s17 is negative, steps s1 to s3 and steps s10 to s12 are repeated again to store ruled line data included in ruled line print data for the next block, namely, the successive ruled line data, stored in the receiving buffer 4 in the prebuffer 5a.

After the ruled line data for the entire printing range with respect to the row direction has been stored in the prebuffer 5a, the microprocessor 1 controls the dot density converting unit 9 to convert all the ruled line data stored in the prebuffer 5a in batch into dot image data matching the print dot density of the printing unit 13 (step s13), and then controls the print control unit 6 to store the converted dot image data in the dot image memory 7 (step s14).

After the dot density conversion and storage in the dot image memory 7 of the ruled line data for one page have been completed, the microprocessor 1 controls the print interface 8 to transfer the converted dot image data from the dot image memory 7 to the printing unit 13 to print out the converted dot image data.

Although the function of the printer control system has been described as applied to processing ruled line data, the printer control system of the present invention is applicable to processing any kind of data expressed by dot image data including image data representing patterns.

Furthermore, the printer control system has been described as applied to the control of a page printer, the printer control system of the present invention is applicable likewise to any printer which prints in a dot matrix.

As is apparent from the foregoing description, the printer control system of the present invention does not start the print dot density conversion until all the print data for the entire printing range with respect to the row direction are stored in the dot image memory even if ruled line print data including the ruled line data or image print data including the image data for the entire printing range with respect to the direction of row is received in a plurality of blocks. Accordingly, the dislocation of the position of dots in the row direction between printed lines, attributable to the decimal part of the dot density conversion ratio, does not occur, and hence the printer is able to print in a high print quality.

Although the invention has been described in its preferred form with a certain degree of particularity, it is to be understood that many variations and changes are possible in the invention without departing from the scope thereof.

What is claimed is:

1. A printer control system for controlling a printer unit having a first print dot density in accordance with print data of a second print dot density which is different for the first print dot density, said printer control system comprising:

interface means for receiving the print data of the second print dot density, the print data including ruled line data of the second print dot density defining print dots to be printed within a printing range, the printing range extending in a row direction and a line direction;

buffer emory means, operatively coupled to said interface means, for storing at least a portion of the ruled line data of the second print dot density, said portion corresponding to an entire row of the printing range;

print dot density converting means, operatively coupled to said buffer memory means, for converting in batch the portion of the ruled lined data of the second print dot density corresponding to the entire row of the printing range stored in said buffer memory means into dot density converted ruled line data of the first print dot density; and, printer unit control means, operatively coupled to said print dot density converting means and having means for operatively coupling with the printer unit, for controlling the printer unit in accordance with the dot density converted ruled line data.

2. A printer control system for controlling a printer unit having a first print dot density in accordance with print data and font data received form an external unit, said printer control system comprising:

interface means for receiving the print data and font data from the external unit;

resident font memory means for storing at least one resident font;

dot density converting means for converting a print dot density of at least one external font contained within the font data into at least one dot density converted external font of the first print dot density;

external font memory means, operatively coupled to said dot density converting means, for storing the at least one dot density converted external font converted by said dot density converting means;

discriminating means, operatively coupled to said interface means, for discriminating the print data received from the external unit as one of resident font image data, external font image data, and ruled line image data, each defining print dots to be printed within a printing range, the printing range extending in a row direction and a line direction;

buffer memory means, operatively coupled to said interface means and said discriminating means, for storing at least a portion of the ruled line data said portion corresponding to an entire row of the printing range;

wherein said dot density converting means is operatively coupled to said buffer memory means and includes means for converting in batch a dot density of the portion of the ruled line data corresponding to the entire row of the printing range into dot density converted ruled line data of the first print dot density; and, printer unit control means, operatively coupled to said resident font memory means, said external font memory means, said discriminating means, said interface means, and said dot density converting means, and having means for operatively coupling to the printer unit, for controlling the printer unit in accordance with at least one of (a) the resident font image data and the at least one resident font, (b) the external font image data and the at least one dot density converted external font, and (c) the dot density converted ruled line data.

* * * * *